United States Patent
Subbarao et al.

(10) Patent No.: US 7,892,312 B2
(45) Date of Patent: Feb. 22, 2011

(54) NITRIFICATION INHIBITOR AND SOIL IMPROVER AND FERTILIZER CONTAINING THE SAME

(75) Inventors: Guntur V. Subbarao, Tsukuba (JP); Kazuhiko Nakahara, Tsukuba (JP); Takayuki Ishikawa, Fujioka-machi (JP); Osamu Ito, Tsukuba (JP); Hiroshi Ono, Tsukuba (JP); Mayumi Kameyama, Kashiwa (JP); Mitsuru Yoshida, Tsukuba (JP); Marco Rondon, Cali (CO); Idupulapati Madhusudana Rao, Cali (CO); Carlos Lascano, Cali (CO); Manabu Ishitani, Cali (CO)

(73) Assignee: Japan International Research Center for Agricultural Sciences, Ibaraki (JP)

( * ) Notice: Subject to any disclaimer, the term of this patent is extended or adjusted under 35 U.S.C. 154(b) by 626 days.

(21) Appl. No.: 11/498,961

(22) Filed: Aug. 4, 2006

(65) Prior Publication Data
US 2007/0028659 A1 Feb. 8, 2007

(30) Foreign Application Priority Data
Aug. 8, 2005 (JP) .............................. 2005-230091

(51) Int. Cl.
C05D 9/02 (2006.01)

(52) U.S. Cl. ............................................... 71/27; 71/18
(58) Field of Classification Search .................... 71/27; 260/555
See application file for complete search history.

(56) References Cited

U.S. PATENT DOCUMENTS 3,011,884 A * 12/1961 Goring ............................. 71/1
3,192,033 A * 6/1965 McCorquodale, Jr. .......... 71/28
3,689,551 A * 9/1972 Patterson et al. ................ 564/3

OTHER PUBLICATIONS

Princeton Dictionary of "Chemical compound".*

* cited by examiner

Primary Examiner—Stuart Hendrickson
Assistant Examiner—Richard M Rump
(74) Attorney, Agent, or Firm—Westerman, Hattori, Daniels & Adrian, LLP

(57) ABSTRACT

A nitrification inhibitor and a soil improver and a fertilizer containing the same are offered which can be utilized in a wide area from a tropical to a temperate zone, and can be easily obtained from natural origin materials. It is a nitrification inhibitor to inhibit soil nitrification, containing as a main component either one of linoleic acid, α-linolenic acid, γ-linolenic acid, and methyl linoleate, or their mixture of two or more. By incorporating this nitrification inhibitor into a soil improver or a fertilizer, nitrification of soil can be effectively inhibited.

12 Claims, 2 Drawing Sheets

| | Substance (20 ppm) | Chemical Formula | Nitrification-Inhibitive Ratio (%) |
|---|---|---|---|
| Examples 1 & 2 | Linoleic acid | $CH_3(CH_2)_4CH=CHCH_2CH=CH(CH_2)_7COOH$ | 95 |
| Examples 1 & 3 | α-Linolenic acid | $CH_3CH_2CH=CHCH_2CH=CHCH_2CH=CH(CH_2)_7COOH$ | 95 |
| Example 4 | γ-Linolenic acid | $CH_3(CH_2)_4CH=CHCH_2CH=CHCH_2CH=CH(CH_2)_4COOH$ | 95 |
| Example 5 | Methyl linoleate | $CH_3(CH_2)_4CH=CHCH_2CH=CH(CH_2)_7COOCH_3$ | 95 |
| Comparative Example 1 | Stearic acid | $CH_3(CH_2)_{16}COOH$ | No activity |
| Comparative Example 2 | Oleic acid | $CH_3(CH_2)_7CH=CH(CH_2)_7COOH$ | No activity |
| Comparative Example 3 | Vaccenic acid | $CH_3(CH_2)_5CH=CH(CH_2)_9COOH$ | No activity |
| Comparative Example 4 | Arachidonic acid | $CH_3(CH_2)_4(C=CHCH_2)_4(CH_2)_2COOH$ | No activity |
| Comparative Example 5 | Methyl oleate | $CH_3(CH_2)_7CH=CH(CH_2)_7COOCH_3$ | No activity |
| Comparative Example 6 | Methyl α-linolenic acid | $CH_3CH_2CH=CHCH_2CH=CHCH_2CH=CH(CH_2)_7COOCH_3$ | No activity |
| Comparative Example 7 | Ethyl linoleate | $CH_3(CH_2)_4CH=CHCH_2CH=CH(CH_2)_7COOC_2H_5$ | No activity |

FIG. 1

| Substance (20 ppm) | Chemical Formula | Nitrification-Inhibitive Ratio (%) |
|---|---|---|
| Examples 1 & 2 | Linoleic acid | $CH_3(CH_2)_4CH=CHCH_2CH=CH(CH_2)_7COOH$ | 95 |
| Examples 1 & 3 | α-Linolenic acid | $CH_3CH_2CH=CHCH_2CH=CHCH_2CH=CH(CH_2)_7COOH$ | 95 |
| Example 4 | γ-Linolenic acid | $CH_3(CH_2)_4CH=CHCH_2CH=CHCH_2CH=CH(CH_2)_4COOH$ | 95 |
| Example 5 | Methyl linoleate | $CH_3(CH_2)_4CH=CHCH_2CH=CH(CH_2)_7COOCH_3$ | 95 |
| Comparative Example 1 | Stearic acid | $CH_3(CH_2)_{16}COOH$ | No activity |
| Comparative Example 2 | Oleic acid | $CH_3(CH_2)_7CH=CH(CH_2)_7COOH$ | No activity |
| Comparative Example 3 | Vaccenic acid | $CH_3(CH_2)_5CH=CH(CH_2)_9COOH$ | No activity |
| Comparative Example 4 | Arachidonic acid | $CH_3(CH_2)_4(C=CHCH_2)_4(CH_2)_2COOH$ | No activity |
| Comparative Example 5 | Methyl oleate | $CH_3(CH_2)_7CH=CH(CH_2)_7COOCH_3$ | No activity |
| Comparative Example 6 | Methyl α-linolenic acid | $CH_3CH_2CH=CHCH_2CH=CHCH_2CH=CH(CH_2)_7COOCH_3$ | No activity |
| Comparative Example 7 | Ethyl linoleate | $CH_3(CH_2)_4CH=CHCH_2CH=CH(CH_2)_7COOC_2H_5$ | No activity |

| | Nitrification Inhibitor (1000 ppm) | Nitric Acid Concentration (ppmN) | |
|---|---|---|---|
| | | After 30 Days | After 60 Days |
| Example 6 | Methyl linoleate | 10 | 10 |
| Example 7 | α-Linolenic acid | 18 | 16 |
| Example 8 | Linoleic acid | 19 | 62 |
| Comparative Example 8 | None | 101 | 209 |

NITRIFICATION INHIBITOR AND SOIL IMPROVER AND FERTILIZER CONTAINING THE SAME

FIELD OF THE INVENTION

The present invention relates to a nitrification inhibitor and soil improvers and fertilizers containing the same, which can inhibit nitrification of soil.

BACKGROUND OF THE INVENTION

The oxidation reaction of ammonia, namely, nitrification caused by the action of soil micro-organisms results in the serious loss of nitrogen fertilizers used for agricultural and horticultural production, and the pollution of soil environment. In order to inhibit such soil nitrification, mainly such synthetic chemicals have so far been used as nitrapyrin (2-chloro-6-Trichloromethylpyridine) and dicyandiamide (See, for example, Patent Reference 1.).

Among the synthetic chemicals, nitrapyrin is so highly volatile that it shows almost no effect under the condition where the earth temperature is over 20° C., and hence it has only limited use in the limited environment such as winter crop in North America.

On the other hand, dicyandiamide is effective at higher temperature compared with nitrapyrin, but since its use concentration is high and price is high, it seriously affects the cost of agricultural production, thereby utilizable area is limited. From such background, the development of economical nitrification inhibition is sought which could be used in the wide area from tropical to temperate zone.

Non-Patent References 1 and 2 report the phenomenon in which nitrification is inhibited in the soil where a tropical pasture grass of rice family, creeping signal grass (Brachiaria humidicola), grows.

[Patent Reference 1] Japanese Laid-Open Patent Publication H11-278973A (1999)
[Non-Patent Reference 1] CIAT 1983 annual report, p. 224
[Non-Patent Reference 2] CIAT 1985 annual report, p. 210-211
[Non-Patent Reference 3] USFDA 21CFR 573,640
[Non-Patent Reference 4] Iizumi et al., Appl. Environment. Mcrobiol., vol. 64, p. 3656-3662, 1998

SUMMARY OF THE INVENTION

Although said synthetic chemicals have so far been used to inhibit nitrification of agricultural and horticultural soil, but there is a problem that each synthetic chemical has its own defect, and its utilizable area and object crops are limited.

From said background, there is a problem that no economical nitrification inhibitor has been obtained which is utilizable in wide areas from tropical to temperate zones.

The object of the present invention is, in reference to the above-mentioned problems, to provide a nitrification inhibitor and a soil improver and a fertilizer containing the same, which are utilizable in wide areas from tropical to temperate zones, and can be easily obtained from materials of natural origin.

The present inventors have completed the present invention, based on the phenomenon that nitrification is inhibited in the soil where a tropical rice family pasture grass, creeping signal grass, grows, by expecting the presence of nitrification-inhibitory substance in said plant tissue, isolating and obtaining the nitrification-inhibitory substance as a result of dedicated study, finding that the essence of the nitrification-inhibitory substance is two kinds of unsaturated fatty acids, linoleic acid and α-linolenic acid, and further by confirming the nitrification-inhibitory effect of γ-linolenic acid and methyl ester of linoleic acid.

In order to attain the above-mentioned object, the nitrification inhibitor in accordance with the present invention is characterized to contain either one of linoleic acid, α-linolenic acid, γ-linolenic acid, and methyl linoleate or their mixture of two or more as the main component to inhibit nitrification of soil. According to the above-mentioned constitution, a nitrification inhibitor to prevent nitrification of soil can be offered by using either one of linoleic acid, α-linolenic acid, γ-linolenic acid, and methyl linoleate which can be easily manufactured by decomposing a neutral fat contained in various plant oils and fats. The nitrification inhibitor of the present invention shows a nitrification-inhibitory effect equal or superior to the conventionally used nitrification-inhibitory substances.

The soil improver in accordance with the present invention is characterized to contain a nitrification inhibitor containing either one of linoleic acid, α-linolenic acid, γ-linolenic acid, and methyl linoleate or their mixture of two or more. According to the above-mentioned constitution, a soil improver can be offered which contains a low cost nitrification inhibitor containing either one of linoleic acid, α-linolenic acid, γ-linolenic acid, and methyl linoleate which can be easily manufactured by decomposing a neutral fat contained in various plant oils and fats. Since said soil improver contains a nitrification inhibitor, it can inhibit nitrification of nitrogen components and prevent the deterioration of soil environment.

The fertilizer in accordance with the present invention is characterized to contain a nitrification inhibitor containing either one of linoleic acid, α-linolenic acid, γ-linolenic acid, and methyl linoleate or their mixture of two or more. According to the above-mentioned constitution, a fertilizer can be offered which contains a low cost nitrification inhibitor containing either one of linoleic acid, α-linolenic acid, γ-linolenic acid, and methyl linoleite which can be easily manufactured by decomposing a neutral fat contained in various plant oils and fats. Since said fertilizer contains a nitrification inhibitor, it can inhibit nitrification of nitrogen components, save the quantity of the fertilizer, and prevent the deterioration of soil environment.

According to the present invention, a nitrification inhibitor capable of maintaining effective nitrogen components in soil and preventing deterioration of soil environment, and a fertilizer or a soil improver containing said nitrification inhibitor can be obtained.

BRIEF DESCRIPTION OF THE DRAWINGS

FIG. 1 is a table showing the nitrification-inhibitory ratio of various fatty acids and fatty acid esters of Examples and Comparative Examples.

DETAILED DESCRIPTION OF THE PREFERRED EMBODIMENT

Figures 2, 3:
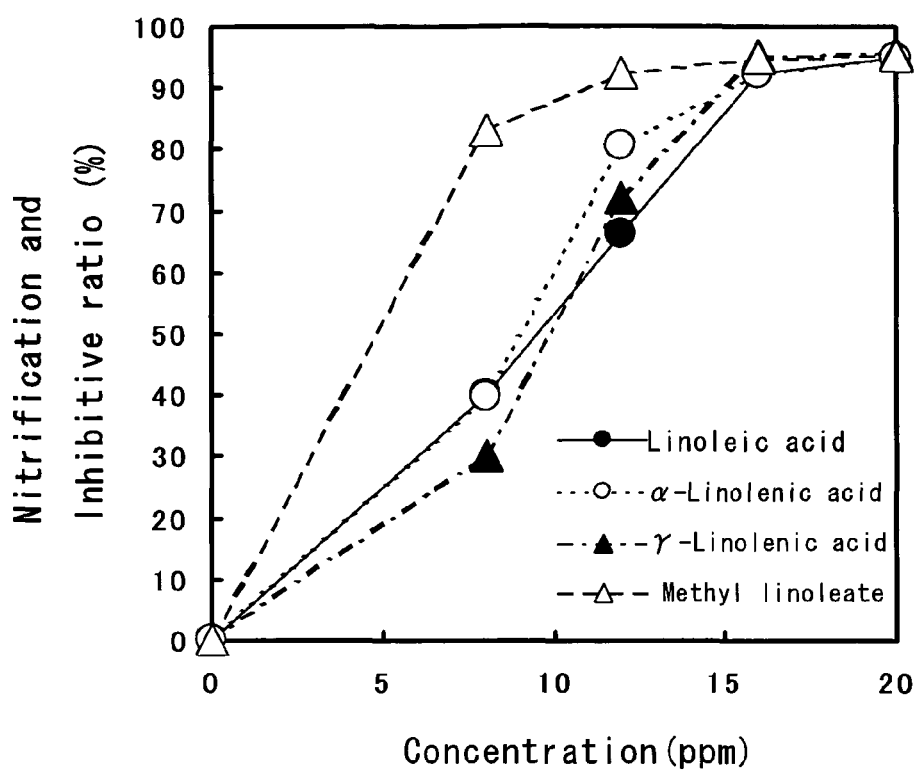
FIG. 2 is a graph showing the concentration dependency of the nitrification-inhibitory ratio by the nitrification inhibitors of Examples.
FIG. 3 is a table showing the measurement results of nitrate concentration after 30 and 60 days for fertilizers of Examples 6-8 and Comparative Example 8.

The embodiment of the present invention will be explained in detail hereafter, referring to the attached figures.

Explanation is first made of the nitrification inhibitor of the present invention.

The nitrification inhibitor of the present invention contains as a main component either one of linoleic acid, α-linolenic acid, γ-linolenic acid, and methyl linoleate, or their mixture of two or more, and has a function to inhibit nitrification, that is, the oxidative reaction of ammonia in soil.

The chemical structural formulae of said linoleic acid ($C_{17}H_{31}COOH$), α-linolenic acid ($C_{17}H_{29}COOH$), γ-linolenic acid ($C_{17}H_{28}COOH$), and methyl linoleate ($C_{17}H_{31}COOCH_3$) are shown in the chemical formulae (1)-(4) below.

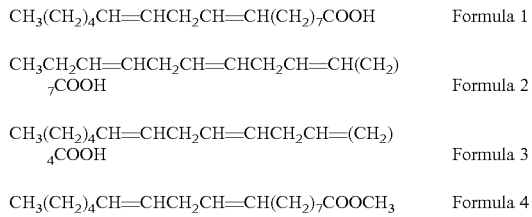

| | |
|---|---|
| $CH_3(CH_2)_4CH=CHCH_2CH=CH(CH_2)_7COOH$ | Formula 1 |
| $CH_3CH_2CH=CHCH_2CH=CHCH_2CH=CH(CH_2)_7COOH$ | Formula 2 |
| $CH_3(CH_2)_4CH=CHCH_2CH=CHCH_2CH=(CH_2)_4COOH$ | Formula 3 |
| $CH_3(CH_2)_4CH=CHCH_2CH=CH(CH_2)_7COOCH_3$ | Formula 4 |

Said nitrification inhibitors are all natural oil and fat-origin compounds, and can be easily manufactured by known methods, that is, by decomposing a neutral fat contained in various plant oils and fats. Linoleic acid and α-linolenic acid as the nitrification inhibitors in accordance with the present invention can also be extracted from creeping signal grass.

The nitrification inhibitors of the present invention, linoleic acid, α-linolenic acid, γ-linolenic acid, and methyl linoleate, strongly inhibit nitrificiation in the test using a nitrification bacteria (*Nitrosomonas europaea*), as well as in soil tests. Said nitrificiation-inhibitory function shows the effect equal or superior to the conventional nitrificiation-inhibitory substances.

The nitrification inhibitors of the present invention are non-volatile. Therefore, when sprayed or mixed in soil, nitrificiation-inhibitory function can be maintained for long period in soil.

Since linoleic acid, α-linolenic acid, and γ-linolenic acid used as the nitrification inhibitors of the present invention are nutritious components contained in many foods, their safety is quite high. Methyl linoleate is also harmless to human bodies within the ordinary use range, (See Non-Patent Reference 3.) its safety is quite high.

Explanation is next made of a soil improver containing the nitrification inhibitor of the present invention.

A soil improver containing the nitrification inhibitor of the present invention is so composed that its nitrification inhibitor contains either one of linoleic acid, α-linolenic acid, γ-linolenic acid, and methyl linoleate or their mixture of two or more. The soil improver of the present invention may contain, in addition to the nitrification inhibitor, such inorganic materials as lime and such fertile soil as black soil. Further, as a soil improver for horticulture, a potting compost containing fertilizer may do. The preferred content of the nitrification inhibitor of the present invention to be added to the soil improver is about 0.1-1 weight %. As the content of the nitrification inhibitor, 1 weight % is sufficient for nitrification inhibition, so that no more addition is necessary. On the contrary, if the content of the nitrification inhibitor is 0.1 weight % or less, nitrification-inhibitory effect is small and hence not preferable.

Since the soil improver containing the nitrification inhibitor of the present invention contains the nitrification inhibitor, it can inhibit nitrification of nitrogen components, and prevent deterioration of soil environment. Linoleic acid, α-linolenic acid, γ-linolenic acid, and methyl linoleate used as the nitrification inhibitor can be easily manufactured by decomposing a neutral fat contained in various plant oils and fats. Therefore, the soil improver containing the nitrification inhibitor of the present invention can be manufactured at low cost.

Explanation is next made of a fertilizer containing the nitrification inhibitor of the present invention.

A fertilizer containing the nitrification inhibitor of the present invention is so composed that its nitrification inhibitor contains either one of linoleic acid, α-linolenic acid, γ-linolenic acid, and methyl linoleate or their mixture of two or more.

Here, as the fertilizer, inorganic or organic fertilizers may be mentioned, and their mixture may well do. As such inorganic fertilizers, such nitrogen fertilizers as urea, ammonium sulfate, and ammonium chloride, such phosphate fertilizers as calcium perphosphate, and such potassium fertilizers as potassium chloride may be used. Also, as organic fertilizers, bone powder or compost may be used. The preferable content of the nitrification inhibitor of the present invention to be added to a fertilizer is about 0.1-1 weight %. Since 1 weight % is sufficient for nitrification inhibition as the content of the nitrification inhibitor, no more addition is necessary. On the contrary, if the content of the nitrification inhibitor is 0.1 weight % or less, nitrification-inhibitory effect is small and hence not preferable.

Since the fertilizer containing the nitrification inhibitor of the present invention contains the nitrification inhibitor together with fertilizing components, it can inhibit nitrification of nitrogen components, save the fertilizer, and prevent deterioration of soil environment.

EXAMPLE 1

Hereinafter, the present invention is explained in more detail referring to examples.

As Example 1, a nitrification-inhibitory substance was extracted from creeping signal grass. First, 100 g of the above-ground portion of a freeze-dried creeping signal grass plant body was homogenized with 200 $cm^3$ of 80% methanol, soaked for 3 hours at room temperature, thereby the methanol extract was obtained.

Next, the methanol extract was concentrated by using a rotary evaporator. This concentrate was partitioned by diethyl ether:water=5:2. The activity was detected in the diethyl ether layer. The diethyl ether layer was concentrated, dissolved in a small amount of methanol, fractionated by a reverse phase column chromatography (WAKO JUNYAKU KOGYO, Wakoge 140C18), thereby an active fraction was obtained. This active fraction was further fractionated by a high speed liquid chromatography with a column (TOSO, TSKgel Super ODS). Finally two active substances were purified.

The chemical structures of thus obtained two compounds were determined by mass spectroscopy and proton and carbon nuclear magnetic resonance analyses. These two compounds showed identical spectrograms, respectively, to linoleic acid and α-linolenic acid, and hence were identified as linoleic acid and α-linolenic acid.

EXAMPLE 2

As a nitrification inhibitor of Example 2, linoleic acid was prepared by the method shown below.

An appropriate amount of 0.1% sodium hydroxide was added to 1 liter (1000 $cm^3$) of linseed oil while heating to hydrolyze, and then neutralized with hydrochloric acid, thereby the oil separated from water was obtained. This oil was purified by silica gel column chromatography and others, thereby linoleic acid was prepared.

EXAMPLE 3

As a nitrification inhibitor of Example 3, α-linolenic acid was prepared by the method shown below.

An appropriate amount of 0.1% sodium hydroxide was added to 1 liter of linseed oil while heating to hydrolyze, and then neutralized with hydrochloric acid, thereby the oil separated from water was obtained. This oil was purified by silica gel column chromatography and others, thereby α-linolenic acid was prepared.

EXAMPLE 4

As a nitrification inhibitor of Example 4, γ-linolenic acid was prepared by the method shown below.

An appropriate amount of 0.1% sodium hydroxide was added to 0.1 liter of the oil obtained by squeezing primrose seeds while heating to hydrolyze, and then neutralized with hydrochloric acid, thereby the oil separated from water was obtained. This oil was purified by silica gel column chromatography and others, thereby γ-linolenic acid was prepared.

EXAMPLE 5

As a nitrification inhibitor of Example 5, methyl linoate was prepared by the method shown below.

0.2 liter of methanol was added to 1 liter of linseed oil, into which then added was an appropriate amount of 0.1% sodium hydroxide while heating to hydrolyze, and then neutralized with hydrochloric acid, thereby the oil separated from water was obtained. This oil was purified by silica gel column chromatography and others, thereby methyl linoate was prepared.

Comparative Examples 1-7

As the comparative examples of fatty acids, commercial available stearic acid (Comparative Example 1), oleic acid (Comparative Example 2), vaccenic acid (Comparative Example 3), and arachidonic acid (Comparative Example 4) were prepared.

Also, as methyl or ethyl esters of fatty acids, all of commercially available methyl oleate (Comparative Example 5), methyl α-linolenate (Comparative Example 6), and ethyl linoleate (Comparative Example 7) were prepared.

Explanation is next made of the nitrification-inhibitory function of fatty acids and fatty acid esters of the above-described Examples and Comparative Examples.

Observation was conducted using in-vitro nitrification bacteria. Explanation is first made of preparation of suspension of the nitrification bacteria used for observation.

The nitrification bacteria (*Nitrosomonas europaea* IF014298. See Non-Patent Reference 4.) with a bacteria-origin luciferase gene (luxAB) introduced therein was aerobically cultivated in P culture media containing 25 mg/1000 cm$^3$ of kanamycin at 30° C. for 7-9 days, and after washing, suspended in fresh P culture media, thereby nitrification bacteria suspension was prepared. This nitrification bacteria suspension was kept in the dark place for 30 minutes or longer before experiment.

The composition of P culture media consists of 2.5 g of $(NH_4)_2SO_4$, 0.7 g of $KH_2PO_4$, 13.5 g of $Na_2HPO_4$, 0.5 g of $NaHCO_3$, 100 mg of $MgSO_4$-$7H_2O$, 5 mg of $CaCl_2$-$2H_2O$, 1 mg of Fe-EDTA, and 1000 cm$^3$ of water, and its pH was 8.0.

Nitrification function was evaluated by, after mixing in-vitro the aqueous solution of nitrification bacteria suspension consisting of 0.25 cm$^3$ of said nitrification bacteria suspension and 0.2 cm$^3$ of water and 0.01 cm$^3$ of the sample solution of each Example and Comparative Example, measuring biological luminescence accompanying nitrification reaction during cultivation at 15° C. for 30 minutes using a luminometer (Turner Designs, TD20/20). The biological luminescence accompanying nitrification reaction decreases if a sample solution of each Example and Comparative Example has nitrification-inhibitory substance. Therefore, the luminescence of the case where a sample solution of each Example and Comparative Example is added to the aqueous solution of nitrification bacteria suspension divided by the luminescence of the case of aqueous bacteria suspension without addition of a sample solution of each Example and Comparative Example was defined as nitrification-inhibitory ratio.

FIG. 1 is a table showing the nitrification-inhibitory ratio of various fatty acids and fatty acid esters of Examples and Comparative Examples. The concentration of sample solutions of each Example and Comparative Example in this case was 20 ppm.

As is obvious from the figure, it is seen that the nitrification-inhibitory ratio was 95% for linoleic acid of Examples 1 and 2, α-linolenic acid of Examples 1 and 3, and γ-linolenic acid of Example 4 as fatty acids. It is obvious that the nitrification-inhibitory ratio was 95% for methyl linoleate of Example 5.

Contrary to Examples, it is obvious that nitrification reaction was not inhibited for any of stearic acid, oleic acid, vaccenic acid, and arachidonic acid as fatty acids of Comparative Examples 1-4, and methyl oleate, methyl α-linolenate, and ethyl linoleate as fatty acid esters of Comparative Examples 5-7.

Next, the concentration dependency of nitrification-inhibitory ratio was studied for linoleic acid, α-linolenic acid, γ-linolenic acid, and methyl linoleate of Examples 1-5 which turned out to be nitrification inhibitors. Measurement was conducted as mentioned above with the concentration of sample solutions of each Example and Comparative Example in the aqueous nitrification bacteria suspension varying 0-20 ppm.

FIG. 2 illustrates the concentration dependency of nitrification to inhibitory ratio by nitrification inhibitors of Examples. In FIG. 2, the abscissa shows the sample solution concentration (ppm) of each Example and Comparative Example, and the ordinate shows the nitrification-inhibitory ratio (%).

As is obvious from the figure, it is seen that the nitrification-inhibitory ratios of linoleic acid of Examples 1 and 2 were 40, 65, 90, and 95%, respectively, when linoleic acid concentration was changed to 8, 12, 16, and 20 ppm.

It is obvious that the nitrification-inhibitory ratios of α-linolenic acid of Examples 1 and 3 were 40, 80, 90, and 95%, respectively, when α-linolenic acid concentration was changed to 8, 12, 16, and 20 ppm.

It is obvious that the nitrification-inhibitory ratios of γ-linolenic acid of Example 4 were 30, 72, 90, and 95%, respectively, when γ-linolenic acid concentration was changed to 8, 12, 16, and 20 ppm.

It is clarified that the nitrification-inhibitory ratios of methyl linoleate of Example 5 were 80, 90, 92, and 95%, respectively, when methyl linoleate concentration was changed to 8, 12, 16, and 20 ppm.

From the result above, it is clarified that the nitrification-inhibitory ratios increase as the concentrations increase for all of linoleic acid, α-linolenic acid, γ-linolenic acid, and methyl linoleate of Examples. The concentrations at which nitrification-inhibitory ratios of respective substances was 80% (hereinafter, to be properly called 80% inhibition concentration) were about 16, 12, 16, and 8 ppm, respectively, for linoleic acid, α-linolenic acid, γ-linolenic acid, and methyl linoleate. It is clarified from this that 80% inhibition concentration decreases in order of linoleic acid, γ-linolenic acid, α-linolenic acid, and methyl linoleate, and methyl linoleate has the lowest concentration.

The 80% inhibition concentration of conventional nitrification inhibitors composed with synthetic chemicals is 4 ppm for nitrapyrin and 185 ppm for dicyandiamide.

It is obvious from this that 80% inhibition concentration of nitrification inhibitors of Examples 1-5 equals to that of nitrapyrin, and sufficient nitrification-inhibitory function can be obtained at concentration far lower than dicyandiamide. It is novel finding that nitrification reaction of nitrification bacteria is inhibited by these fatty acids and fatty acid esters of Examples.

EXAMPLE 6

As Example 6, a fertilizer composition was prepared consisting of ammonium sulfate as a fertilizing component, methyl linoleate as a nitrification inhibitor, and black soil.

The black soil was taken from the surface soil of 0-15 cm depth of the test farm of Japan International Research Center for Agricultural Sciences in Yawatadai, Tsukuba city, Ibaraki, Japan, and was composed of clay 54.8%, silt 26.3%, and sand 18.9%, and its total carbon content was 30 g/kg, and total nitrogen content was 2.64 g/kg. This black soil was air-dried and homogenized using a sieve of 2 mm to obtain dry black soil (hereinafter, to be properly called dry soil).

The fertilizer of Example 6 was prepared by mixing homogeneously with dry soil using a mortar ammonium sulfate by 200 ppm of added nitrogen and methyl linoleate by 1000 ppm per dry soil.

EXAMPLE 7

The fertilizer of Example 7 was prepared similarly to Example 1 except that α-linolenic acid was used as a nitrification inhibitor instead of methyl linoleate.

EXAMPLE 8

The fertilizer of Example 8 was prepared similarly to Example 1 except that linoleic acid was used as a nitrification inhibitor instead of methyl linoleate.

Comparative Example 8

The fertilizer of Comparative Example 8 was prepared similarly to Example 1 except that no nitrification inhibitor was added.

Next, the nitrification-inhibitory effect of fertilizers was measured for Examples 6-8 and Comparative Example 8.

As the measurement, the fertilizers of Examples 6-8 and Comparative Example 8 were put into glass vessels, lids of resin film, for example, of parafilm (brand name) were put thereon with open needle holes, and set into a temperature and moisture-controlled oven. This oven was controlled to the temperature of 20° C. and the water saturation in the space among soils of the fertilizer to 60%.

After a certain time, 2 g of the fertilizer was taken out, 20 cm³ of 2 M (mole) potassium chloride was added, shaken for 2 hours, nitrate in the fertilizer was extracted, and filtered. The nitrate ion contained in this filtrate was quantitatively measured by using the automatic ion analysis apparatus (Brant+Luebbe, type number AAII).

FIG. 3 is a table showing the measurement results of nitrate concentration after 30 days and 60 days for the fertilizers of Examples 6-8 and Comparative Example 8.

As is obvious from the figure, the nitrate concentrations after 30 days and 60 days for the fertilizer containing 1000 ppm of methyl linoleate of Example 6 were both 10 ppmN which is nitrogen content in soil.

The nitrate concentrations after 30 days and 60 days for the fertilizer containing 1000 ppm of α-linolenic acid of Example 7 were 18 and 16 ppmN, respectively.

The nitrate concentrations after 30 days and 60 days for the fertilizer containing 1000 ppm of linoleic acid of Example 8 were 19 and 62 ppmN, respectively.

On the other hand, in case of the fertilizer with no nitrification inhibitor added therein of Comparative Example 8, the nitrate concentrations after 30 days and 60 days were 101 and 209 ppmN, respectively. This nitrate concentration after 30 days of Comparative Example 8 is higher by several to ten folds of the nitrate concentrations for the fertilizers containing nitrification inhibitor of Examples 6-8. Further, the nitrate concentration after 60 days of Comparative Example was about twice that after 30 days, increased proportionally to the preservation days.

Next, the 50% functional concentration, that is, the concentration of a nitrification inhibitor inhibiting 50% of nitrification was studied. Concretely, as the fertilizers of Examples 6-8, those with nitrification inhibitors of various concentrations were prepared, and kept for 30 days in a temperature and humidity-controlled oven. As the results, the 50% functional concentrations of respective nitrification inhibitors of Examples 6-8 after 30 day keeping were 330, 200, and 330 ppm, respectively.

It appeared from this that nitrification-inhibitory effect was remarkable for the fertilizers of Examples 6-8, and especially, methyl linoleate effectively inhibited nitrification also in soil.

As is clarified from the examples mentioned above, the nitrification inhibitors of Examples have nitrification-inhibitory effect equal to nitrapyrin as a nitrification inhibitor of the prior synthetic chemical. Also, the fertilizers containing nitrification inhibitors of Examples were obvious to be capable of effective nitrification inhibition.

The present invention is in no way limited only to the forms of the embodiments mentioned above, but appropriate variations are possible within the range of the present invention, and needless to say that these are also included within the range of the present invention. For example, the compositions of soil improvers and fertilizers containing the nitrification inhibitor of the present invention may be properly designed according to agricultural products and flowers to be grown, and needless to say that it is not limited to the examples mentioned above.

What is claimed is:

1. A nitrification inhibitor, comprising:
    one or more compounds selected from the group consisting of linoleic acid, α-linolenic acid, and γ-linolenic acid,
    wherein the one or more compounds constitutes a main component to inhibit nitrification of soil, and the concentration of said main component is 8 ppm to 1000 ppm in a solution.

2. A method for inhibiting nitrification in soil, comprising:
    spraying or mixing one or more compounds selected from the group consisting of linoleic acid, α-linolenic acid, and γ-linolenic acid in soil.

3. The method for inhibiting nitrification in soil according to claim 2, wherein the one or more compounds is sprayed or mixed together with a fertilizer.

4. The method for inhibiting nitrification in soil according to claim 2, wherein the concentration of the one or more compounds is 8 ppm to 1000 ppm in a solution.

5. A nitrification inhibitor, consisting essentially of:
one or more compounds selected from the group consisting of linoleic acid, α-linolenic acid, and γ-linolenic acid,
wherein the one or more compounds constitutes a main component to inhibit nitrification of soil, and the concentration of the main component is 8 ppm to 1000 ppm in a solution.

6. A soil improver, comprising:
a nitrification inhibitor, the nitrification inhibitor being at least one compound selected from the group consisting of linoleic acid, α-linolenic acid, and γ-linolenic acid; and
inorganic materials or fertile soil;
wherein the content of the nitrification inhibitor is from 0.02 to 1 weight % in the soil improver.

7. The soil improver according to claim 6, wherein the content of the nitrification inhibitor is from 0.1 to 1 weight % in the soil improver.

8. A fertilizer, comprising:
a nitrification inhibitor, the nitrification inhibitor being at least one compound selected from the group consisting of linoleic acid, α-linolenic acid, and γ-linolenic acid; and
an inorganic fertilizer, an organic fertilizer or a mixture of the inorganic fertilizer and the organic fertilizer;
wherein the content of the nitrification inhibitor is from 0.02 to 1 weight % in the fertilizer.

9. The fertilizer according to claim 8, wherein the content of the nitrification inhibitor is from 0.1 to 1 weight % in the soil improver.

10. The nitrification inhibitor according to claim 1, wherein the concentration of the main component is from 8 ppm to 20 ppm in a solution.

11. The method for inhibiting nitrification in soil according to claim 2, wherein the concentration of the one or more compounds is 8 ppm to 20 ppm in a solution.

12. The nitrification inhibitor according to claim 5, wherein the concentration of the main component is from 8 ppm to 20 ppm in a solution.

* * * * *